(12) United States Patent
Giladi et al.

(10) Patent No.: US 10,171,233 B2
(45) Date of Patent: *Jan. 1, 2019

(54) SYSTEM AND METHOD FOR EFFICIENT SUPPORT FOR SHORT CRYPTOPERIODS IN TEMPLATE MODE

(71) Applicant: Futurewei Technologies, Inc., Plano, TX (US)

(72) Inventors: Alexander Giladi, Princeton, NJ (US); Shaobo Zhang, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,765

(22) Filed: Nov. 30, 2015

(65) Prior Publication Data

US 2016/0099805 A1 Apr. 7, 2016

Related U.S. Application Data (63) Continuation of application No. 13/871,889, filed on Apr. 26, 2013, now Pat. No. 9,270,461.
(Continued)

(51) Int. Cl.
*H04L 9/06* (2006.01)
*H04L 9/08* (2006.01)
(Continued)

(52) U.S. Cl.
CPC ........ *H04L 9/065* (2013.01); *G06F 17/30887* (2013.01); *H04L 9/088* (2013.01);
(Continued)

(58) Field of Classification Search
CPC . H04L 9/065; H04L 9/088; H04L 9/18; H04L 67/02; H04L 65/602; H04L 65/607;
(Continued)

(56) References Cited

U.S. PATENT DOCUMENTS 7,684,568 B2 3/2010 Yonge et al.
2006/0184790 A1 8/2006 Oliveira et al.
(Continued)

FOREIGN PATENT DOCUMENTS

| WO | 2010078281 A2 | 7/2010 |
| WO | 2011038032 A2 | 3/2011 |
| WO | 2012011743 A2 | 1/2012 |

OTHER PUBLICATIONS

Piron, L. Giladi, A., and Singer, D.; "Segment Encryption for DASH segments"; Working Draft, ISO/IEC JTC1/SC29/WG11, MPEG2012/N 12526, Feb. 2012, San Jose, CA, USA.*
(Continued)

*Primary Examiner* — Shanto Abedin
*Assistant Examiner* — Adrian Stoica
(74) *Attorney, Agent, or Firm* — FutureWei Technologies, Inc.

(57) ABSTRACT

System and method embodiments are provided herein for efficient representation and use of initialization vectors (IVs) for encrypted segments using template mode representation in Dynamic Adaptive Streaming over Hypertext Transfer Protocol (DASH). An embodiment method includes sending in a media presentation description (MPD), from a network server to a client, a template for generating a universal resource locator (URL) to obtain an IV that is used for encrypting a segment, in absence of an IV value in the MPD, receiving from the client a URL configured according to the template, and upon receiving the URL, returning an IV corresponding to the URL to the client. Another embodiment method includes receiving in a MPD, at a client from a network server, a template for generating a URL to obtain an IV that is used for encrypting a segment, upon detecting an absence of an IV value or IV base value in the MPD,
(Continued)

configuring a URL for the IV using the template, sending the URL for the IV, and receiving an IV.

28 Claims, 3 Drawing Sheets

Related U.S. Application Data (60) Provisional application No. 61/639,635, filed on Apr. 27, 2012.

(51) Int. Cl.
| | |
|---|---|
| H04N 21/262 | (2011.01) |
| H04N 21/4627 | (2011.01) |
| H04N 21/6373 | (2011.01) |
| H04N 21/835 | (2011.01) |
| H04N 21/845 | (2011.01) |
| G06F 17/30 | (2006.01) |
| H04L 29/06 | (2006.01) |
| H04L 29/08 | (2006.01) |
| H04N 21/4408 | (2011.01) |
| H04N 21/61 | (2011.01) |
| H04N 21/858 | (2011.01) |

(52) U.S. Cl.
CPC .......... *H04L 65/602* (2013.01); *H04L 65/607* (2013.01); *H04L 67/02* (2013.01); *H04N 21/26258* (2013.01); *H04N 21/4408* (2013.01); *H04N 21/4627* (2013.01); *H04N 21/6125* (2013.01); *H04N 21/6373* (2013.01); *H04N 21/835* (2013.01); *H04N 21/8456* (2013.01); *H04N 21/8586* (2013.01)

(58) Field of Classification Search
CPC . H04L 9/06; H04L 9/0618; H04L 9/08; H04L 65/60; H04L 65/601; H04L 67/00; H04N 21/26258; H04N 21/4408; H04N 21/4627; H04N 21/6125; H04N 21/6373; H04N 21/835; H04N 21/8456; H04N 21/8586; H04N 21/00; H04N 21/20; H04N 21/25; H04N 21/262; H04N 21/2658; H04N 21/40; H04N 21/44; H04N 21/4405; H04N 21/60; H04N 21/63; H04N 21/637; H04N 21/80; H04N 21/83; H04N 21/845; H04N 21/45; H04N 21/462; G06F 17/30887; G06F 17/30; G06F 17/30861; G06F 17/30876; G07F 17/30; G07F 17/30861; G07F 17/30876; G07F 17/30887
See application file for complete search history.

(56) References Cited

U.S. PATENT DOCUMENTS

| | | | |
|---|---|---|---|
| 2011/0231519 A1 | 9/2011 | Luby et al. | |
| 2012/0023251 A1 | 1/2012 | Pyle et al. | |
| 2012/0090036 A1 | 4/2012 | Kang et al. | |
| 2012/0114118 A1* | 5/2012 | Verma | H04L 9/088 380/42 |
| 2012/0233345 A1* | 9/2012 | Hannuksela | H04N 21/26258 709/231 |
| 2012/0246462 A1 | 9/2012 | Moroney et al. | |
| 2012/0259946 A1* | 10/2012 | Stockhammer | H04L 65/105 709/217 |
| 2013/0007223 A1* | 1/2013 | Luby | H04N 21/23106 709/219 |
| 2013/0246643 A1* | 9/2013 | Luby | H04N 21/23439 709/231 |
| 2013/0290697 A1* | 10/2013 | Wang | H04L 63/0428 713/150 |
| 2014/0226814 A1* | 8/2014 | Fernando | H04L 9/06 380/200 |
| 2016/0198013 A1 | 7/2016 | Thang et al. | |

OTHER PUBLICATIONS

Giladi, A., Singer, D.; "ISO/IEC FDIS 23009-4: Information technology—Dynamic adaptive streaming over HTTP (DASH)—Part 4: Segment encryption and authentication"; ISO/IEC JTC1/SC29/WG11 MPEG2013/wxxxxx, Jan. 2013, Geneva, Switzerland.*

(Committee Draft), "ISO/IEC CD 23009-4: Information technology—Dynamic adaptive streaming over HTTP (DASH)—Part 4: Segment encryption and authentication", ISO/IEC JTC 1/SC 29N, ISO/IEC JTC 1/SC 29/WG11, May 12, 2012.*

Hartung et al., DRM Protected Adaptive HTTP STreaming, ACM, MMSys'11, San Jose, California, USA, 2011, pp. 277-282.*

Iraj Sodagar, The MPEG-DASH Standard for Multimedia Streaming Over the Internet, IEEE Computer Society, 2011, pp. 62-67.*

International Search Report and Written Opinion received in International Application No. PCT/US13/38521 dated Sep. 27, 2013, 6 pages.

Anthony Vetro, "The MPEG-DASH Standard for Multimedia Streaming Over the Internet," Industry and Standards, IEEE Computer Society, 2011, 7 pages.

Mitsuhiro Hirabayashi, "Realizing seamless streaming delivery using existing Web server, Unfolding next-generation standard "MPEG-DASH" of streaming delivery," Network Software Development Department, Technical Development Department, Sony Corporation, Mar. 19, 2012, 27 pages (including translation).

Pantos, R., "HTTP Live Streaming, draft-pantos-http-live-streaming-08," http://datatracker.ietf.org/drafts/current/, Mar. 23, 2012, 33 pages.

Gregorio, et al., RFC 6570, "URI Template," Internet Engineering Task Force (IEFT), Category: Standards Track, ISSN: 2070-1721, Mar. 2012, 34 pages.

Giladi, Alex et al., "ISO/IEC FDIS 23009-4," International Organisation for Standardisation, ISO/IEC JTC1/SC29/WG11 Coding of Moving Pictures and Audio, Geneva, Switzerland, Jan. 21, 2013, 33 pages.

Hartung, Frank et al., "DRM Protected Dynamic Adaptive HTTP Streaming," Feb. 23, 2011, pp. 277-282.

"Information Technology—Dynamic Adaptive Streaming over HTTP (DASH)—Part 1: Media Presentation Description and Segment Formats," ISO/IEC 23009-1:2012(E), Jan. 5, 2012, 134 pages.

Pantos, R., et al., "HTTP Live Streaming, draft-pantos-http-live-streaming-14," https://datatracker.ietf.org/doc/draft-pantos-http-live-streaming, Oct. 14, 2014, 41 pages.

Piron, Laurent et al., "Segment Encryption for DASH Segments," Working Draft, International Organisation for Standardisation Organisation Internationale De Normalisation ISO/IEC JTC1/SC29/WG11 Coding of Moving Pictures and Audio, San Jose, Feb. 10, 2012, 5 pages.

Extending European Search Report received in Application No. 13799904, 1-1908, dated Dec. 15, 2014, 8 pages.

Information technology—Dynamic adaptive streaming over HTTP (DASH)—Part 1: Media presentation description and segment formats, International Standard, ISO/IEC 23009-1, First Edition, Apr. 1, 2012, 134 pgs.

Pantos, R., et al., "HTTP Live Streaming," Informational Internet—Draft, Oct. 15, 2012, pp. 1-38.

Giladi, A., Singer, D.; "ISO/IEC FDIS 23009-4," International Organisation for Standardisation Organisation Internationale De Normalisation ISO/IEC JTC1/SC29/WG11 Coding of Moving Pictures and Audio, Jan. 2013, Geneva, Switzerland, 33 pages.

Piron, L, Giladi, A., and Singer, D.: "Segment Encryption for DASH segments"; Working Draft, International Organisation for Standardisation Organisation Internationale De Normalisation ISO/IEC JTC1/SC29/WG11 Coding of Moving Pictures and Audio, MPEG2012/N 12526, Feb. 2012, San Jose, USA, 5 pages.

(56) References Cited

OTHER PUBLICATIONS

Reznik et al., "WD of ISO/IEC 23009-3 Implementation Guidelines," Systems subgroup, International Organisation for Standardisation Organisation Internationale De Normalisation ISO/IEC JTC1/SC29/WG11 Coding of Moving Pictures and Audio, Feb. 2012, San Jose, USA, 26 pages.

Giladi, A., Singer, D.; "ISO/IEC FDIS 23009-4: Information technology—Dynamic adaptive streaming over HTTP (DASH)—Part 4: Segment encryption and authentication"; ISO/IEC JTC1/SC29/WG11 MPEG2013/wxxxxx, Jan. 2013, Geneva, Switzerland, 34 pages.

(Committe Draft), "ISO/IEC CD 23009-4: Information technology—Dynamic adaptive streaming over HTTP (DASH)—Part 4: Segment encryption and authentication", ISO/IEC JTC 1/SC 29N, ISO/IEC JTC 1/SC 29/WG 11, May 12, 2012, 22 pages.

Wang, X., Liu, Y., Zhang, S.; "On Key Derivation and Transport for DASH Segment Encryption"; International Organisation for Standardisation Organisation Internationale De Normalisation ISO/IEC JTC1/SC29/WG11 Coding of Moving Pictures and Audio, MPEG2012/m24967, Apr. 2012, Geneva, Switzerland, 7 pages.

\* cited by examiner

SYSTEM AND METHOD FOR EFFICIENT SUPPORT FOR SHORT CRYPTOPERIODS IN TEMPLATE MODE

This application claims the benefit of U.S. patent application Ser. No. 13/871,889 filed on Apr. 26, 2013 by Alexander Giladi et al. and entitled "System and Method for Efficient Support for Short Cryptoperiods in Template Mode", which claims the benefit of U.S. Provisional Application No. 61/639,635 filed on Apr. 27, 2012 by Alexander Giladi et al. and entitled "System and Method for Short Cryptoperiods," both of which are hereby incorporated herein by reference as if reproduced in its entirety

TECHNICAL FIELD

The present invention relates to the field of media streaming, and, in particular embodiments, to a system and method for efficient support for short cryptoperiods in template mode.

BACKGROUND

Dynamic Adaptive Streaming over Hypertext Transfer Protocol (DASH), also known as MPEG-DASH, is developed to enable high quality streaming of media content over the Internet delivered from conventional Hypertext Transfer Protocol (HTTP) web servers. In the DASH architecture, media content can be encoded into media streams at different rates. Media content can be segmented into a plurality of segment files that can be streamed individually and independently from a server or network to a client device, upon receiving request for content from the client. The server also provides media presentation description (MPD) corresponding to a group of segment files, e.g., for a video or program. The MPD includes information that allows the client to play the content. Segments can be obtained by the client using segment templates for generating universal resource locators (URLs) to fetch the content. The segments templates may be provided in the MPD. In the case of encrypted segments, the MPD also includes a key and randomly generated initialization vectors (IVs) that are used with the key for decrypting the segment content at the client side. An efficient representation for IVs is needed to support the segment template mode.

SUMMARY OF THE INVENTION

In accordance with an embodiment, a method for communicating encryption information in template mode in dynamic adaptive streaming over hypertext transfer protocol (DASH) includes sending in a media presentation description (MPD), from a network server to a client, a template for generating a universal resource locator (URL) to obtain an initialization vector (IV) that is used for encrypting a segment, in absence of an IV value in the MPD, receiving from the client a URL configured according to the template, and upon receiving the URL, returning an IV corresponding to the URL to the client.

In accordance with another embodiment, a method for communicating encryption information in template mode in DASH includes receiving in a MPD, at a client from a network server, a template for generating a URL to obtain an IV that is used for encrypting a segment, upon detecting an absence of an IV value or IV base value in the MPD, configuring a URL for the IV using the template, sending the URL for the IV, and receiving an IV.

In accordance with another embodiment, a network component for communicating encryption information in template mode in DASH includes a processor and a computer readable storage medium storing programming for execution by the processor. The programming including instructions to send in a MPD to a client a template for generating a URL to obtain an IV that is used for encrypting a segment, in absence of an IV value in the MPD, receive from the client a URL configured according to the template, and upon receiving the URL, return an IV corresponding to the URL to the client.

In accordance with yet another embodiment, a user device for communicating encryption information in template mode in DASH includes a processor and a computer readable storage medium storing programming for execution by the processor. The programming including instructions to receive in a MPD from a network server a URL IV attribute indicating a template for generating a URL to obtain an IV that is used for encrypting a segment, upon detecting an absence of an IV value in the MPD, configure a URL for the IV using the template, send the URL for the IV, and receive an IV.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
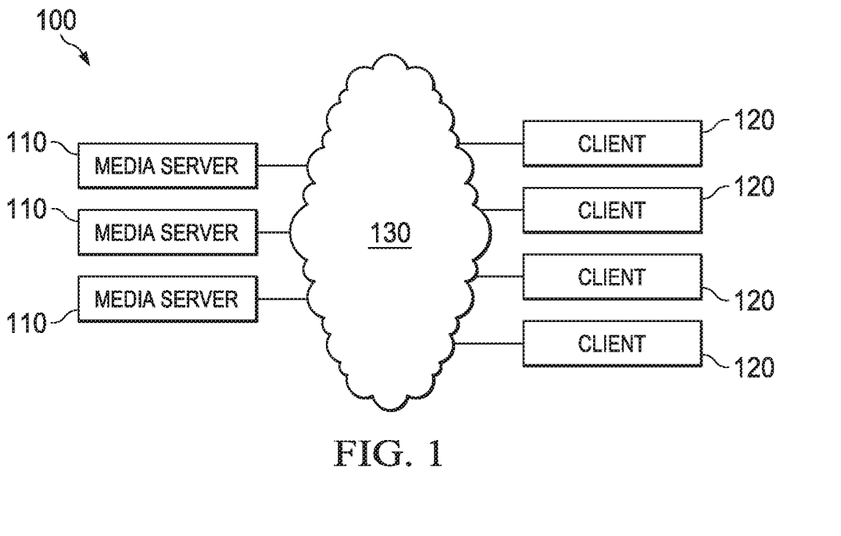
FIG. 1 is an example of a DASH architecture.

FIG. 1 shows an example of a DASH architecture 100 for streaming media (e.g., video, music, games, applications, etc.) to clients (e.g., subscribers or general users). The media can include live broadcast events or programs, on demand content or video, or both. The DASH architecture 100 includes one or more media servers 110 that provide media content, e.g., in the form of segment files according to Organization for Standardization (ISO) Base Media File Format (BMFF). The DASH architecture 100 includes one or more clients 120 that comprise user equipment or devices, such as set-top boxes (STBs), desktop computers, laptop computers, tablet computers, smartphones, or any other type of mobile/personal devices. The clients 120 can receive the media content from the servers 110 over any access network 130, e.g., the Internet, a wireless local area network (WLAN), a WiFi network or hotspot, a cellular network, a cable infrastructure, a fiber optic backbone or access network, or combinations thereof. To receive content using HTTP, the clients 120 need to first request the content.

In the DASH architecture 100, the original content in the server 110 can be encoded into media streams (e.g., video streams) at different rates. A video or other media content can be segmented into a plurality of segments that can be streamed individually and independently from a server 110 to a client 120 over the access network 130. The servers 110 also provide media presentation description (MPD) corresponding to video/media files, e.g., for each group of segment files of a video or program, including information to get the segments (e.g., segment URLs) and play the content (e.g., video rate information). The servers 110 also provide universal resource locators (URLs) for the MPD files to indicate the location of the MPD files in the servers 110 or network 130.

The MPD is sent from the server 110 to the client 120 and describes a manifest (e.g., a list) of the available content (e.g., content segments), its various alternatives, URL addresses (e.g., of content segments), and other characteristics. The MPD can be delivered from a content server 110 to the client 120 using HTTP. By parsing the MPD, the client 120 learns about the content (e.g., a video or a program) timing, content or media availability, media types, resolutions, minimum and maximum bandwidths, the existence of various encoded alternatives of multimedia components, accessibility features and required digital rights management (DRM), media-component locations on the network, and other content characteristics. The media content, e.g., on demand video or a broadcast program, is divided into a plurality of addressed segments that can be forwarded separately. The segments each represents a chunk or portion of the content and has a corresponding URL and duration indicated in the MPD.

Using the information in the MPD, the client 120 selects the appropriate encoded alternative and starts streaming the content by fetching the segments of content using HTTP GET requests. For example, the information includes the locations of the files/segments in the servers 110 and/or network 130. From the MPD information, the client 120 can also determine the video rate based on network conditions for the client 120 (e.g., determine which segments files to get that match a suitable download rate).

Currently, a SegmentList field or parameter can be used in a media presentation description (MPD) for segment encryption. The SegmenList can indicate a list of segments that are encrypted. In case of encrypted segments, randomly generated initialization vectors (IVs) are also provided for decrypting the segments of the same SegmentList at the client. When a SegmentTemplate field or parameter is used in the MPD to describe a template for obtaining segments, the IVs are the segment numbers. This weakens the security of encryption, where it may be easy to learn or discover the IV sequence to decrypt and access the content without authorized access. Further, in HTTP Live Streaming (HLS), random IVs can be inserted in an m3u8 manifest (in the MPD) by putting the IVs into a #EXT-X-KEY tag. This option is not possible with the template mode representation for segments, which reduces the HLS content compatibility in the template mode.

System and method embodiments are provided herein for efficient representation and use of IVs for encrypted segments using template mode representation in DASH. The embodiments include using a URL template for deriving the IVs (at the client). By adding one extra HTTP GET request per cryptoperiod or per segment, using randomly generated IVs becomes possible. The cryptoperiod is the period in which the same decryption parameters (Key and IVs) are used. This allows compatibility in situations where the #EXT-X-KEY tag is used at relatively high frequency. A URL template attribute is added to a ContentProtection element (of the MPD) for generating URL templates for deriving the IVs. When operating in a template mode, a client can check the key and IV values, either once per cryptoperiod using the earliest segment for the $Number$ or $Time$ variable derivation from the URL template, or for every segment if there are no CryptoPeriod elements in the ContentProtection element.

In an embodiment, the ContentProtection element (in the MPD) includes the CryptoPeriod element and a @ivURLTemplate attribute for indicating the IV template URL, as shown in Table 1.

TABLE 1

| Element or Attribute Name | Use | Description |
| --- | --- | --- |
| @schemeIdUri | 1 | This may be urn:mpeg:dash:segenc:2012. |
| CryptoPeriod | 0 . . . N | This specifies information and URLs needed for derivation of key information |
| @keyUrlTemplate | O | This specifies the template for key URL generation, e.g., using same syntax and variable substitution as defined in ISO/IEC 23009-1 sec. 5.3.9.4.4. For a run of segments using the same keyUrl, the segment number inserted is the number of the first segment of the associated CryptoPeriod. Note: use of @keyUrlTemplate does not imply use of SegmentTemplate. |
| @ivUrlTemplate | O | This specifies the URL for IV derivation, e.g., using same syntax and variable substitution as defined in ISO/IEC 23009-1 sec. 5.3.9.4.4. For a CryptoPeriod without a @IV attribute, the segment number inserted is the number of the first segment of the associated CryptoPeriod. Note: use of @ivUrlTemplate does not imply use of either @keyUrlTemplate or SegmentTemplate. |

Legend:
For attributes: M = Mandatory, O = Optional, OD = Optional with Default Value, CM = Conditionally Mandatory.
For elements: <minOccurs> . . . <maxOccurs> (N = unbounded) Elements are bold; attributes are non-bold and preceded with an @

Additionally, an optional @IV attribute of the CryptoPeriod element may be included to specify the initialization vector for the applicable segment(s) within the CryptoPeriod. If this @IV attribute is present, then the attribute value may be used as the IV when encrypting or decrypting with an associated key. The value can be interpreted as a 128-bit hexadecimal number in textual format and can be prefixed with 0x or 0X.

If the @ivUrlTemplate attribute is present in the ContentProtection element, then the IV URL may be derived (at the client) from the @ivUrlTemplate attribute (unless the @IV attribute is present in the current CryptoPeriod element). The content of the HTTP response (from the server or network to client) can contain the IV value in a textual or binary representation. For example, a 128-bit hexadecimal number in textual format and can be prefixed with 0x or 0X. If neither the @IV nor @ivUrlTemplate attributes are present for a CryptoPeriod, the number of the segment may be used (e.g., as in template construction and elsewhere in 5.3.9.4.4 of ISO/IEC 23009-1) as the IV when encrypting or decrypting that media segment. The big-endian binary representation of the sequence number can be placed in a 16-octet buffer and padded (on the left) with zeros.

In another embodiment, the ContentProtection element (in the MPD) includes a CryptoPeriodType element and an @ivUriTemplate attribute for indicating the IV template URL, as shown in Table 2.

TABLE 2

| Element or Attribute Name | Use | Description |
|---|---|---|
| CryptoPeriodType | | This specifies properties common to all cryptoperiods. |
| @numSegments | O | This specifies the number of segments in a cryptoperiod. In case of CryptoTimeline, this is the number of segments in each cryptoperiod of this CryptoTimeline.<br>The attribute @numSegments may be absent if this is the last CryptoPeriod element of the Period. In this case, the cryptoperiod continues till the end of this Period. The attribute @numSegments may not be absent for any CryptoTimeline element. |
| @keyUriTemplate | M | This specifies the template for key URI generation, using same syntax and variable substitution as defined in ISO/IEC 23009-1:2012, 5.3.9.4.4. Attribute @keyUriTemplate is used once each cryptoperiod. Thus for a cryptoperiod CP(i, d), the @keyUriTemplate URI is constructed with $Number$ = i. Same applies for $Time$: the value used is the $Time$ value of segment S(i) is used. The use of @keyUriTemplate does not imply use of @ivUrlTemplate or SegmentTemplate. Key derivation rules described in ISO/IEC 23009-4 sec. 6.4.3 may be used. |
| @ivUriTemplate | O | This specifies the template for IV URI generation using same syntax and variable substitution, e.g., as defined in ISO/IEC 23009-1:2012, 5.3.9.4.4. @ivUriTemplate is used once each cryptoperiod, thus for a cryptoperiod CP(i, d), the @ivUrlTemplate URI is constructed with $Number$ = i. Same applies for $Time$: the value used is the $Time$ value of segment S(i) is used. Use of @ivUrlTemplate does not imply use of either @keyUriTemplate or SegmentTemplate. IV format definition in see ISO/IEC 23009-4 sec. 6.4.4.2 may be used. |

Legend:
For attributes: M = Mandatory, O = Optional, OD = Optional with Default Value, CM = Conditionally Mandatory.
For elements: <minOccurs>...<maxOccurs> (N = unbounded) Elements are bold; attributes are non-bold and preceded with an @.

Frequent cryptoperiod changes are common in the IPTV/Cable ecosystem, where same key and initialization vector combination can exist for 2 to 10 seconds. This can be accommodated in using multiple CryptoPeriod elements. However, when MPD updates are infrequent, the amount of MPD space taken up by the CryptoPeriod elements becomes significant. On the other hand, cryptoperiods tend to have easily predictable lengths (e.g., constant duration of 4 segments). Thus, run-length coding declaring, for example, 120 10-segment cryptoperiods can save about 119 unnecessary lines in a ContentProtection element. When used together with key and IV templates, the overall saving is about 90% in HTTP requests for keys and IVs. In an embodiment, a CryptoTimeline element is also added (to the ContentProtection element) which uses run-length coding for deriving cryptoperiod boundaries. As such, the number of first segment within each derived cryptoperiod is used to bring in a key and IV pair for the cryptoperiod. The CryptoTimeline element may be configured with a plurality of attributes as shown in Table 3.

TABLE 3

| Element or Attribute Name | Use | Description |
|---|---|---|
| CryptoTimeline | | CryptoTimeline element specifying a sequence of constant-duration cryptoperiods of segments. |
| @n | O | Number of constant-duration cryptoperiods within this timeline. If absent, the last cryptoperiod ends with the end of the period that this ContentProtection element belongs to. |
| @d | M | Cryptoperiod duration, in segments, of every period in this CryptoTimeline. |
| @offset | O | Number of segments between the end of the previous CryptoTimeline element and this CryptoTimeline. Zero if absent. In case this is the first CryptoTimeline, the segment number is the first Segment Number of this Period. |

Legend:
For attributes: M = Mandatory, O = Optional, OD = Optional with Default Value, CM = Conditionally Mandatory.
For elements: <minOccurs>...<maxOccurs> (N = unbounded) Elements are bold; attributes are non-bold and preceded with an @

In the case of using the CryptoTimeline element above, the key and IV templates (as described above) are needed. For each CryptoTimeline element, at the beginning of every period specified by the CryptoTimeline, a key and IV pair can be fetched according to the key and IV templates. For segments in each @d duration, the same key/IV pair is used.

In another embodiment, the CryptoTimeline element includes an @ivBase attribute for indicating the corresponding IV, as shown in Table 4.

TABLE 4

| Element or Attribute Name | Use | Description |
| --- | --- | --- |
| CryptoTimeline | | This specifies a sequence of cryptoperiods, each containing same amount of segments. The time duration of cryptoperiods does not have to be constant. The constant is number of segments. |
| @numCryptoPeriods | O | This specifies number of constant-duration cryptoperiods within this timeline. If absent, the last cryptoperiod ends with the end of the Period this ContentProtection descriptor belongs to. This implies that the amount of segments in the last cryptoperiod in this case can be smaller than specified in the @numSegments attribute. |
| @firstStartOffset | OD | This specifies the number of unencrypted segments between the end of the last cryptoperiod and the first segment of the first cryptoperiod in this CryptoTimeline. Default value is 0. Derivation rules described in ISO/IEC 23009-4 sec. 6.4.2 may apply. |
| @ivBase | OD | This specifies the IV base value for this cryptoperiod. When @ivBase is present, IV is a sum of @ivBase and Segment number, e.g., as described in ISO/IEC 23009-4 6.4.4.2. If absent, the default value is 0. The attribute @ivBase is not present if @ivUriTemplate is present. |
| @aadBase | OD | This specifies the AAD base value for this cryptoperiod. AAD is the sum of @aadBase and the Segment Number. If absent, the default value is 0. |
| CryptoPeriodType | — | This specifies the common attributes and elements (attributes and elements from base type CryptoPeriodType), e.g., as described in ISO/IEC 23009-4 sec. 5.1.4. |

Legend:
For attributes: M = Mandatory, O = Optional, OD = Optional with Default Value, CM = Conditionally Mandatory.
For elements: <minOccurs> . . . <maxOccurs> (N = unbounded) Elements are bold; attributes are non-bold and preceded with an @.

Typically, in a key rotation scenario, @firstStartOffset and @numCryptoPeriods are not specified, and the key/IV pair can change every @numSegments segments.

In an example, the ContentProtection element in the case where there are 4-segments cryptoperiods with fixed duration can includes the following syntax:

```
<ContentProtection
    schemeIdUri="urn:mpeg:dash:segenc:2012">
segenc:keyUrlTemplate="https://example.com/keys/key.cgi?cid=
c0c96a693f6b&sn=$Number$05d$"
segenc:ivUrlTemplate="http://example.com/keys/iv.cgi?cid=
c0c96a693f6b&sn=$Number$05d$">
    <segenc:CryptoTimeline d="4"/>
</ContentProtection>
```

Accordingly, during each cryptoperiod, the key and IV are requested from a license server. For example, for the first 4 segments, the key URL is https://example.com/keys/key.cgi?cid=c0c96a693f6b&sn=00001, and the IV URL is http://example.com/keys/iv.cgi?cid=c0c96a693f6b&sn=00001. For the next segments 5 to 8, the key URL is https://example.com/keys/key.cgi?cid=c0c96a693f6b&sn=00005, and the IV URL is http://example.com/keys/iv.cgi?cid=c0c96a693f6b&sn=000015.

Figure 2:
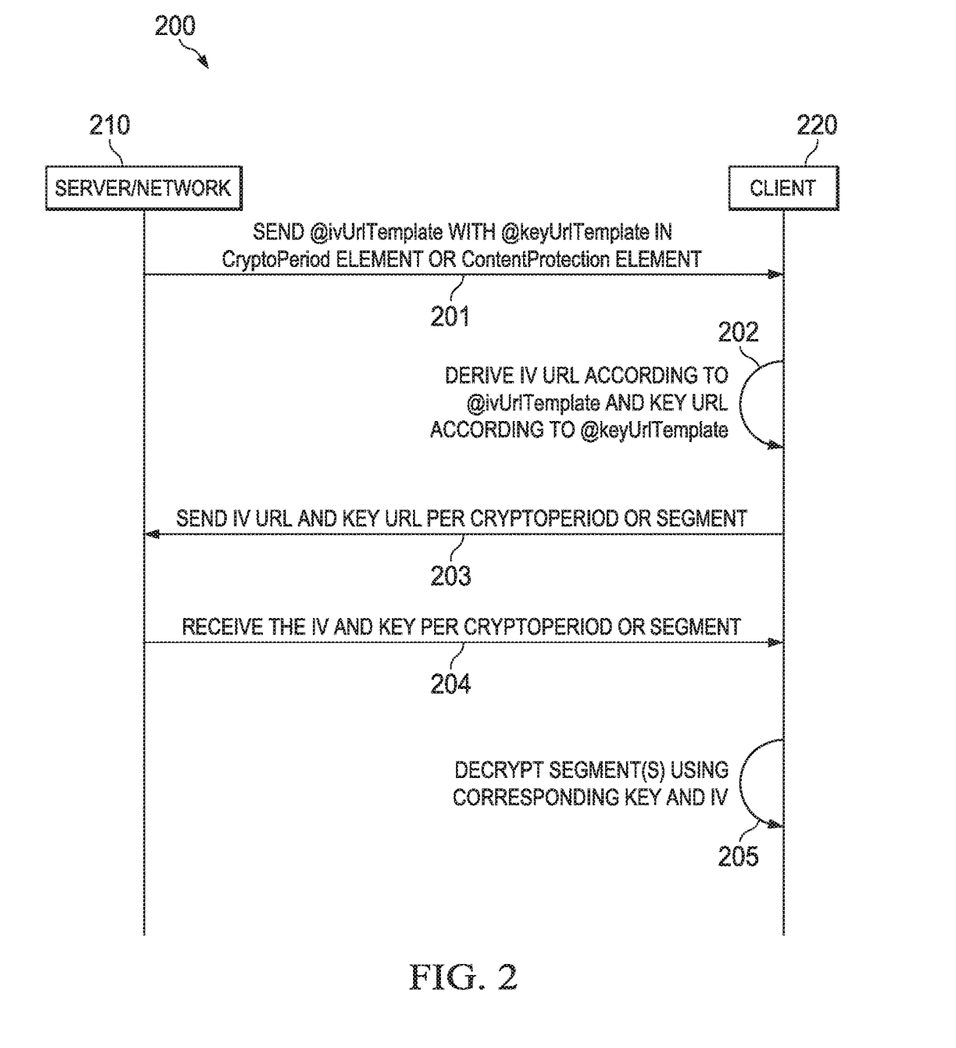
FIG. 2 is a flow diagram for an embodiment method for efficient representation and use of IVs for encrypted content with segment template representation in DASH.

FIG. 2 shows an embodiment method 200 for using a temple IV URL in addition to a template key URL for resolving content encryption in DASH. At step 201, a server or network 210 sends a ContentProtection element (in a MPD) indicating both a key URL template and an IV URL template. For instance, a CryptoPeriod element in the ContentProtection element includes a @ivUrlTemplate attribute in addition to a @keyUrlTemplate, as shown in Table 1. The ContentProtection element may also include a CryptoTimeline element for deriving one or more cryptoperiods at the client. At step 202, the client derives the IV URL according to @ivUrlTemplate (unless an @IV attribute is also included to indicate the IV value to the client). The client also derives the key URL according to @keyUrlTemplate. The client may also derive the cryptoperiods using the CryptoTimeline element if present using run-length coding (as described above). At step 203, the client sends the key and IV URLs, e.g., at the beginning of each of the cryptoptoperiods derived from the CryptoTimeline element or for every segment if there are no CryptoPeriod elements in the Content Protection element. At step 204, the server or network responds with the key and IV for each cryptoperiod or segment. At step 205, the client decrypt the segment(s) using the corresponding key and IV (e.g., per cryptoperiod or per segment).

Figure 3:
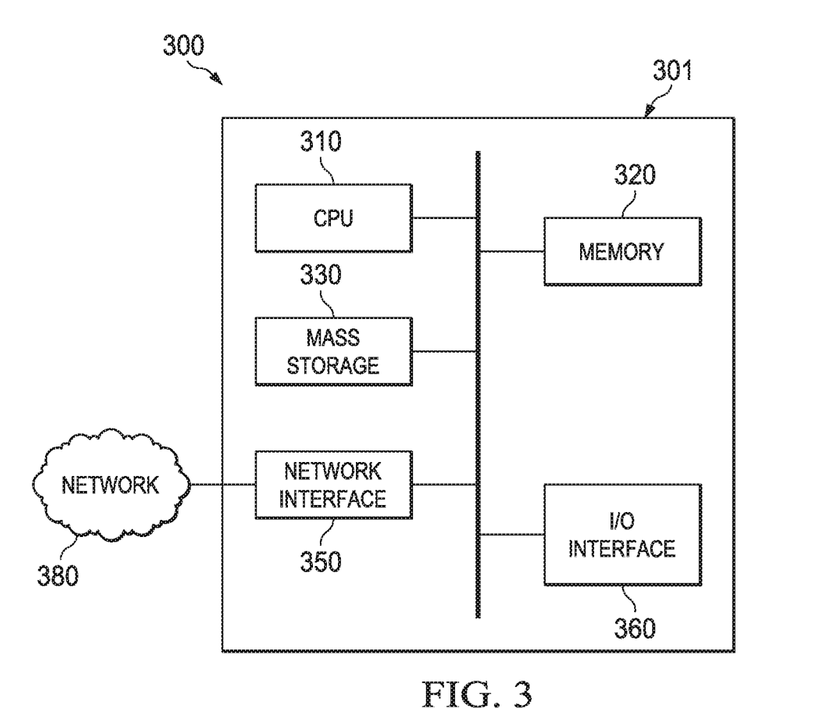
FIG. 3 is a diagram of a processing system that can be used to implement various embodiments.

FIG. 3 is a block diagram of a processing system 300 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a network interfaces, storage interfaces, and the like. The processing unit 301 may include a central processing unit (CPU) 310, a memory 320, a mass storage device 330, and an I/O interface 360 connected to a bus. The bus may be one or more of any type of several bus architectures including a memory bus or memory controller, a peripheral bus or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. In embodiments, the memory 320 is non-transitory. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for communicating encryption information in template mode in dynamic adaptive streaming over hypertext transfer protocol (DASH), the method comprising:
   sending, by a server, a media presentation description (MPD) to a client, wherein the MPD includes a template associated with a universal resource locator (URL),
   receiving, by the server, from the client the URL; and
   sending, by the server, an initialization vector (IV) associated with the URL to the client, wherein the IV is encrypting a segment.

2. The method of claim 1, wherein the segment is associated with a cryptoperiod where a plurality of segments are encrypted with same encryption parameters.

3. The method of claim 2, wherein the MPD includes a CryptoPeriod element including an IV URL template attribute for indicating the template for generating the URL and a key URL template attribute for indicating another template for generating a URL for a key, and wherein the encryption parameters include the IV and the key.

4. The method of claim 1 further comprising indicating in the MPD an IV attribute used for indicating that the IV is for decrypting a segment encrypted based on the IV at the client.

5. The method of claim 1 further comprising:
   providing the client with a key and an IV per each of the cryptoperiods.

6. The method of claim 5, wherein the MPD includes a CryptoTimeline element indicating the sequence of cryptoperiods including a first attribute for indicating a number of constant-duration cryptoperiods within a timeline, a second attribute for indicating a number of unencrypted segments between the end of a last cryptoperiod and a first segment of a first cryptoperiod within the timeline, and a third attribute for indicating an IV base value for a cryptoperiod.

7. The method of claim 5, wherein the MPD includes a CryptoTimeline element indicating the sequence of cryptoperiods including a first attribute for indicating a number of constant-duration cryptoperiods within a timeline, a second attribute for indicating a cryptoperiod duration, in segments, of every cryptoperiod within the timeline, and a third attribute for indicating a number of segments between the end of a previous CryptoTimeline element and the timeline.

8. The method of claim 1, wherein the IV sent to the client is in a textual or binary representation in the body of an HTTP response.

9. The method of claim 1, wherein the MPD is in absence of the IV.

10. The method of claim 1, wherein the MPD indicates a sequence of cryptoperiods of constant duration each including the same number of segments.

11. A method for communicating encryption information in template mode in dynamic adaptive streaming over hypertext transfer protocol (DASH), the method comprising:
    receiving, by a client, a media presentation description (MPD), from a server, wherein the MPD includes a template associated with a universal resource locator (URL);
    configuring, by the client, a URL for an IV using the template;
    sending, by the client, the URL to the server; and
    receiving, by the client, an initialization vector (IV) associated with the URL, wherein the received IV is for decrypting a segment at the client.

12. The method of claim 11 further comprising:
    receiving an IV attribute used for indicating that the IV is for decrypting the segment, wherein the IV attribute is included in the MPD; and
    using the IV indicated by the IV attribute for decrypting the segment.

13. The method of claim 11 further comprising:
    per each of the cryptoperiods, using an IV and a key to decrypt all segments.

14. The method of claim 13 further comprising, for each cryptoperiod of the cryptoperiods, fetching the IV and the key used to decrypt the segments at the start of the cryptoperiod using respective IV and key URLs according to the template for generating the URL and another template for a URL of the key indicated in the MPD.

15. The method of claim 14, wherein the IV and the key are fetched using an earliest segment for a number or time variable derivation from a template associated with the segment in the MPD.

16. The method of claim 11, wherein the IV is received from the server.

17. The method of claim 11, wherein the URL is configured upon detecting an absence of the IV.

18. The method of claim 11, wherein the MPD indicates a sequence of cryptoperiods of constant duration each including the same number of segments.

19. A network component for communicating encryption information in template mode in dynamic adaptive streaming over hypertext transfer protocol (DASH), the network component comprising:
a processor; and
a non-transitory computer readable storage medium storing programming for execution by the processor, the programming including instructions to:
send a media presentation description (MPD) to a client, wherein the MPD includes a template associated with a universal resource locator (URL);
receive from the client the URL; and
sending an initialization vector (IV) associated with the URL to the client, wherein the IV is for encrypting a segment.

20. The network component of claim 19, wherein the MPD includes a CryptoPeriodType element including an IV URL template attribute for indicating the template for generating the URL and a key URL template attribute for indicating another template for generating a URL for a key, and wherein the IV and the key are encryption parameters for the segment.

21. The network component of claim 19, wherein the MPD includes a CryptoTimeline element indicating the sequence of cryptoperiods including a first attribute for indicating a number of constant-duration cryptoperiods within a timeline, a second attribute for indicating a number of unencrypted segments between the end of a last cryptoperiod and a first segment of a first cryptoperiod within the timeline, and a third attribute for indicating an IV base value for a cryptoperiod.

22. The network component of claim 19, wherein the MPD is in absence of the IV.

23. The network component of claim 19, wherein the MPD indicates a sequence of cryptoperiods of constant duration each including the same number of segments.

24. A device for communicating encryption information in template mode in dynamic adaptive streaming over hypertext transfer protocol (DASH), the device comprising:
a processor; and
a non-transitory computer readable storage medium storing programming for execution by the processor, the programming including instructions to:
receive a media presentation description (MPD) from a network component, wherein the MPD includes an attribute indicating a template associated with a universal resource locator (URL);
configure a URL using the template;
send the URL to the network component; and
receive an initialization vector (IV), associated with the URL, wherein the received IV is for decrypting a segment at the device.

25. The device of claim 24, wherein the MPD includes a CryptoTimeline element indicating a sequence of cryptoperiods including a first attribute for indicating a number of constant-duration cryptoperiods within a timeline, a second attribute for indicating a number of unencrypted segments between the end of a last cryptoperiod and a first segment of a first cryptoperiod within the timeline, and a third attribute for indicating an IV base value for a cryptoperiod.

26. The device of claim 24, wherein the IV is received from the network component.

27. The device of claim 24, wherein the programming including instructions to:
configure the URL upon detecting an absence of the IV for in the MPD.

28. The device of claim 24, wherein the MPD indicates a sequence of cryptoperiods of constant duration each including the same number of segments.

* * * * *

UNITED STATES PATENT AND TRADEMARK OFFICE
CERTIFICATE OF CORRECTION

PATENT NO. : 10,171,233 B2  
APPLICATION NO. : 14/954765  
DATED : January 1, 2019  
INVENTOR(S) : Alexander Giladi et al.

Page 1 of 1

It is certified that error appears in the above-identified patent and that said Letters Patent is hereby corrected as shown below:

On the Title Page

After (72) before ( * ) : insert --(73) Assignee: Futurewei Technologies, Inc., Plano, TX (US)--

Signed and Sealed this  
Fourteenth Day of July, 2020

Andrei Iancu  
*Director of the United States Patent and Trademark Office*